Oct. 14, 1941.   C. K. ELWOOD   2,258,678
TRAILER HITCH AND STEERING DEVICE
Filed June 28, 1940   2 Sheets-Sheet 2
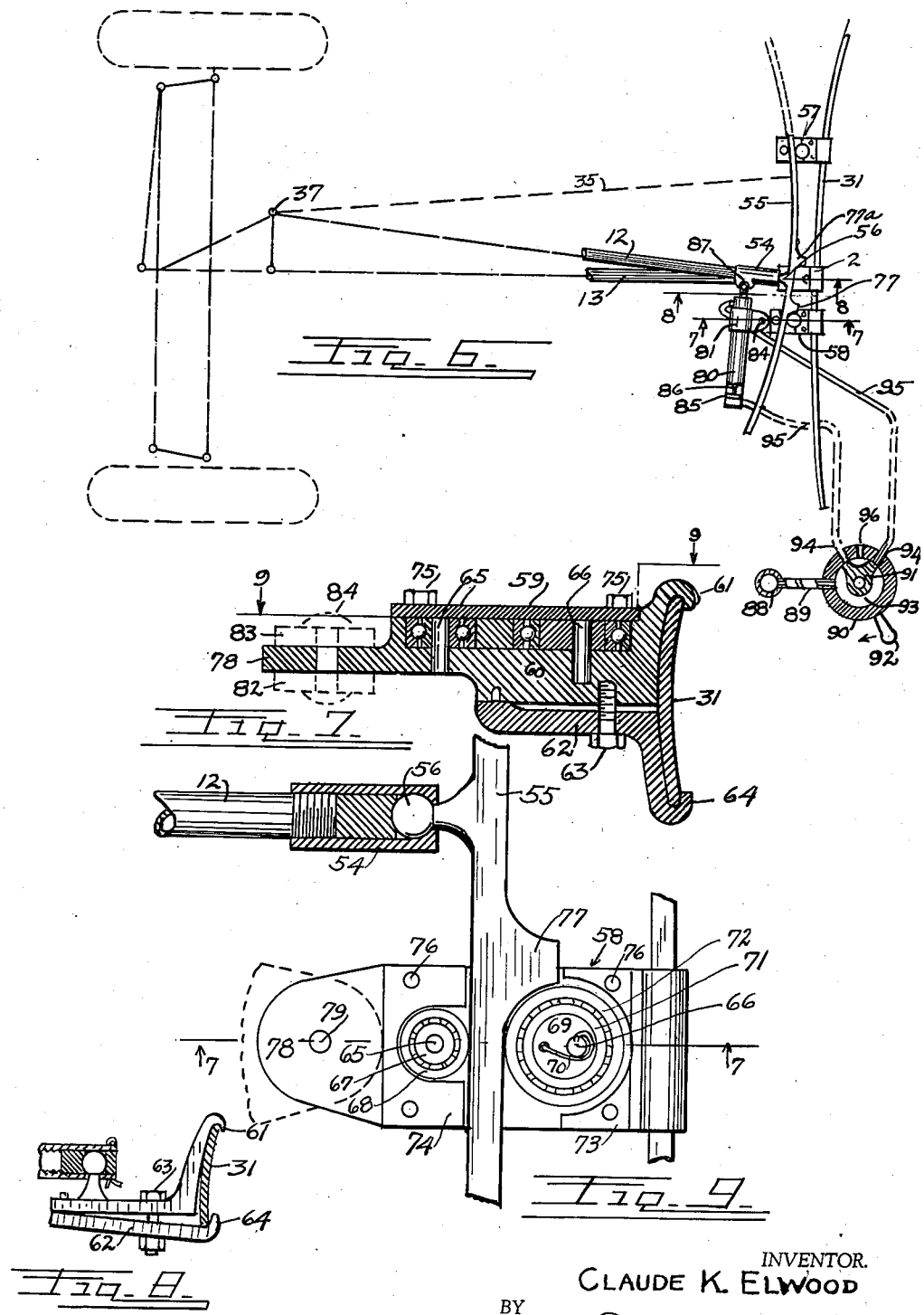
INVENTOR.
CLAUDE K. ELWOOD
BY Martin E. Anderson Patented Oct. 14, 1941

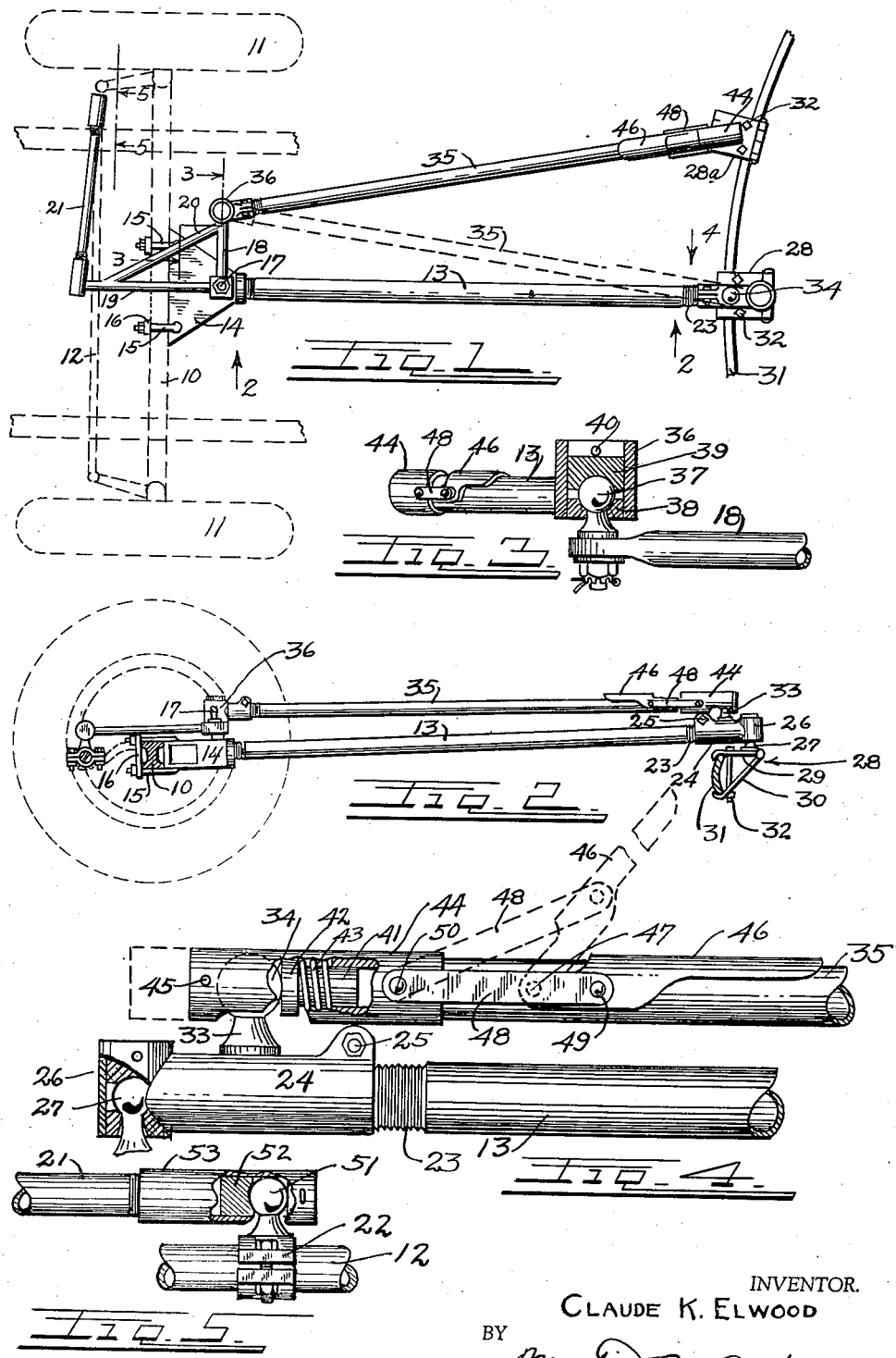

2,258,678

UNITED STATES PATENT OFFICE 2,258,678

TRAILER HITCH AND STEERING DEVICE

Claude K. Elwood, Glendo, Wyo.

Application June 28, 1940, Serial No. 342,989

1 Claim. (Cl. 280—33.55)

This invention relates to improvements in trailer hitches and steering devices.

It is the object of this invention to produce a trailer hitch and steering device of a very simple and substantial construction that can be readily applied to any trailer and which will permit the tow car to be backed while the trailer is connected therewith.

Another object of this invention is to produce a simple and substantial trailer hitch and steering mechanism that can be shifted either manually or by means of power so that in the latter case the driver of the tow car does not have to leave his seat before backing his car and trailer, but can manipulate the steering mechanism by means of a simple valve positioned within easy reach.

In United States Patent No. 1,955,178, granted to me on April 17, 1934, a trailer hitch and steering mechanism for a similar purpose is shown and described and in United States Patent No. 2,100,447, granted on November 30, 1937, another trailer hitch and steering device has been illustrated and described.

The invention to which this application relates will be described in connection with an ordinary two-wheeled trailer of the type in quite common use. It is well known that such trailers when hitched to the tow car by means of a tongue secured to the trailer axle or to the trailer and when the wheels are held against movement relative to the axle, otherwise than a rotary movement, the trailer will follow the tow car in a very satisfactory manner and even when going around curves the wheels do not have to be adjusted with respect to the axle. If a tow car having such a trailer attached to it were to back, the trailer would soon "jack knife" unless the rearward direction were in an absolutely straight line.

It is often necessary in parking and going in and out of garages, to be able to back a tow car with a trailer attached and it is to this purpose that this invention primarily relates.

In order to describe this invention so that its construction and mode of operation can be readily understood, reference will be had to the accompanying drawings, in which the invention has been illustrated in its preferred form, and in which:

Figure 1 is a top plan view of the trailer hitch and steering device showing the same in operative position, the trailer parts being indicated by broken lines;

Figure 2 is a view looking in the direction of arrow 2, Figure 1 with the steering bar in dotted line position;

Figure 3 is a section taken on line 3—3, Figure 1;

Figure 4 is a view looking in the direction of arrow 4 with the steering bar in the position indicated by dotted lines in Figure 1; the parts being shown reversed in direction to that in which they appear in Figure 1.

Figure 5 is a fragmentary side elevation looking in the direction of arrows 5—5, Figure 1;

Figure 6 is a top plan view of a modified embodiment of the invention, showing the parts in which the invention resides in full lines, the remainder being shown in broken lines;

Figure 7 is a section taken on line 7—7, Figure 9;

Figure 8 is a section taken on line 8—8, Figure 9; and

Figure 9 is a view taken along line 9—9 Figure 7.

In the drawings the axle of the trailer has been indicated by broken lines and has been designated by reference numeral 10. The wheels of the trailer have been designated by reference numerals 11 and the connecting rod by reference numeral 12. A tongue 13 is provided at its rear end with a triangular connecting member 14, which in the embodiment illustrated is built from plates and is provided with bolts 15 that extend rearwardly and through cross bars 16 which engage the axle of the trailer to the rear thereof, as shown most clearly in Figure 2. Extending upwardly from the part 14 is a pivot 17 on which is operatively mounted a bell crank lever having a short arm 18, a long arm 19 and a diagonal brace 20. The free end of arm 19 is attached by a ball and socket joint to one end of a drag link 21, whose other end is connected to the rod 12 by means of a similar ball and socket connection and a two-part clamp 22, the manner of the connection being quite clearly shown in Figure 5.

It will now be evident that when the bell crank lever is rocked about its pivot, it will impart a corresponding movement to the wheels 11 with respect to the axle 10. The front end of the tongue has a threaded section 23 that is operatively connected with a sleeve 24 which can be rotated thereon for the purpose of adjustment and which is clamped in adjusted position by means of a bolt 25. The front end of sleeve 24 is provided with a vertical tubular member 26 containing a socket connection which has been indicated more or less diagrammatically in Figure 4 and by means of which the front end of the tongue is connected with the ball pivot 27 that is carried by the clamp 28 shown in Figure 2, whose construction is best shown in Figure 2, and which consists of two jaws 29 and 30 that are secured to the bumper 31 of the tow car by means of a bolt 32. Extending upwardly from the sleeve 24 is a pivot 33 terminating in a ball 34. The purpose of this pivot is to enable the front end of the steering bar 35 to be attached to the tongue when it is moved into the broken line position shown in Figure 1.

The steering bar 35 is provided at its rear end with a vertical tubular member 36 by means of which it is connected with the free end of arm 18. This connection is similar to the one shown in Figure 3 from which it will be seen that the free end of the arm 19 has an upwardly extending pivot 37 that is operatively associated with a socket comprising the two members 38 and 39. Member 39 is held in place by means of a pin 40. The other end of the steering bar is provided with a socket connection by means of which it may be attached or detached from the ball pivot 33 shown in Figure 2.

Referring now more particularly to Figure 4, it will be observed that the steering bar is tubular and has its front end provided with a plug 41 that extends into the open end thereof and this plug has an enlarged head 42 whose rear shoulder forms an abutment for a spring 43. A sleeve 44 is slidably connected with the front end of bar 35 and has its outer end closed by means of a plug that is held in place by a pin 45. A lever 46 is pivoted to the steering bar by means of a pivot pin 47 so that it may move from the full line to the broken line position shown in Figure 4. A link 48 is pivotally connected with lever 46 at 49 and is similarly connected with the sleeve 44 at 50. When the lever 46 is moved from the full to the broken line position shown in Figure 4, sleeve 44 will move towards the left to the position indicated by broken lines, thereby separating the two socket members so as to permit the front end of the bar to be either attached or detached from the ball pivot 34.

Referring now to Figure 1 it will be seen that a clamp of substantially the same construction as that indicated by numeral 28 and which has been designated by reference numeral 28a is secured to the bumper 31 by means of bolts 32. This clamp has an upwardly extending pivot that terminates in the ball similar to ball 34 and which is adapted to be received in the socket illustrated in Figure 4. When the steering bar is attached to the ball pivot carried by the clamp 28a, the parts are in the position shown in full lines in Figure 1 and when they are in this position the tow car can be backed or moved towards the left when viewed as in Figure 1 and will impart to the wheels 11 a proper angular relation with the axle 10 to permit the tow car and the trailer to be moved backwardly.

In order to obtain the proper inclination of the wheels, the lengths of the arms 18 and 19, as well as the distance between the ball pivot 34 on sleeve 24 and the corresponding ball pivot carried by clamp 28a must be properly related to each other. In the drawings the arm 18 has been shown as substantially one-half the length of arm 19 and the steering bar 35 has been shown as outwardly inclined with respect to the tongue 13.

The drawings, although made with considerable care, is not intended to disclose the exact proportions as these are to be finally determined and incorporated in the device itself.

Referring now to Figure 5, it will be observed that the clamp 22 has an upwardly extending pivot terminating in a ball 51 that cooperates with a socket, one member of which has been designated by reference numeral 52. This socket is held in adjusted position by the sleeve 53 that is threadedly connected with the drag link 21.

When the trailer is pulled forwardly along the road, the steering bar 35 is moved from the full line to the dotted line position shown in Figure 1 and when in this position the arm 18, tongue 13 and steering bar 35 form a stress triangle that positively prevents the bell crank lever from turning about its pivot and therefore holds the wheels 11 in a fixed angular relation with axle 10. It is well understood that a two-wheel trailer operates most successfully when the wheels are held against angular movement with respect to the axle of the trailer and it is only when the tow car and the trailer are to be backed or moved reversely that the steering bar has to be moved to the position shown in Figure 1.

With the arrangement illustrated in Figures 1 to 5, it is necessary for the driver of the tow car or his assistant to manually shift the steering bar 35 from the dotted line to the full line position before the tow car is backed and as this occurs quite infrequently, it is no serious objection as by resorting to a manual operation, the mechanism can be greatly simplified.

In United States Patent No. 1,955,178, which was granted on April 17, 1934, a mechanism has been shown in which two steering bars are employed and which can be moved from inoperative to operative position by the driver of the tow car without the necessity of leaving his seat. Such mechanism, although very convenient, requires a number of additional parts which increase the cost of manufacture.

In Figures 6 to 9, inclusive, applicant has shown a modified form of construction in which the steering bar can be moved from nonsteering to steering position by means of a fluid pressure apparatus controlled by a valve located adjacent the driver of the tow car, and which therefore permits him to move the parts into backing position without leaving his seat.

In Figure 6, the parts that are substantially identical with those already shown and described have been shown diagrammatically and only such portions of the apparatus as have been changed in construction have been shown in full lines.

In this modified form of construction, the steering bar 12 has been provided with a sleeve 54 that is substituted for sleeve 44 shown in Figure 4. An arcuate rod 55 is attached to the front end of the steering bar by means of a ball headed pivot 56 that is secured to the steering bar by means of a socket connection like that shown in Figure 9. The rod 55 is curved about the center of pivot 37 and extends substantially equidistantly from both sides of the pivot.

For the purpose of supporting the rod 55 two brackets have been provided and which have been designated by reference numerals 57 and 58. The bracket 58 is shown in plan in Figure 9 and in section in Figure 7. In Figure 9, the cover 59 has been removed so as to disclose the cam and roller positioned beneath the same. The bracket 58 consists of a body 60 that is provided at one end with a hook 61 for engagement over the upper edge of the bumper 31. A cooperating clamp member 62 is secured to the under surface of the body 60 by means of a bolt 63. The clamp member is provided with a hook 64 for engaging the lower edge of bumper 31. Extending upwardly from the upper surface of part 60 are two pivots 65 and 66; secured to the pivot 65 is a cylindrical ball race 67 that forms the inner race of a ball bearing whose outer race has been designated by reference numeral 68. Secured to the pivot 66 is a cylindrical member 69 that has an eccentric opening for the reception of pivot 66. A spring 70 has one end attached to the pivot 66 and the other to member 69 in such a way as to produce a force tending to rotate member 69 in a counterclockwise direction when viewed as in Figure 9. Carried by member 69 is a ball bearing comprising an inner ball race 71 and an outer ball race 72. The two ball bearings are positioned in depressions and are surrounded by walls 73 and 74 that serve as supports for the cover 59 which is secured in place by means of boots 75 that engage in threaded openings 76. The bar 55 extends between the two roller bearings in the manner shown in Figure 9 and is of such size that it is normally in engagement with both bearings. This bar is provided with a lug 77 that has a curved surface corresponding to the outer curvature of ball race 72. When bar 55 is moved downwardly when viewed as in Figure 9, the curved surface of lug 77 engages the ball race 72 and produces a force that tends to turn the eccentric 69 in a counterclockwise direction, thereby producing a clamping force that holds the bar from rattling so long as it is subjected to a force that has a tendency to turn the eccentric in the manner described. The roller bearing comprising the outer ball race 68 is merely for the purpose of reducing friction when the bar 55 is reciprocated.

The body 60 of bracket 58 is provided with a rearward projection 78 that has a central opening 79 for the reception of a pivot pin. A cylinder 80 has one end secured in a tubular sleeve 81 that has two spaced plates 82 and 83 between which the part 78 is received. A rivet or bolt 84 secures the plates 82 and 83 to the part 78 and in this manner a cylinder 80 is supported for pivotal movement. Positioned in the cylinder is a piston 85 to which is attached a piston rod 86. The outer end of this rod is connected to the sleeve 54 by means of a pivot 87.

In the drawings, reference numeral 88 designates a cylinder containing air under pressure or an intake manifold in which case there is a partial vacuum. Member 88 is connected by means of a pipe 89 to a valve 90. This valve has a rotor 91 that is controlled by means of a handle 92. The space indicated by reference numeral 93 is subjected to the pressure of the container 88. The valve 90 has openings 94 that are connected by means of conduits 95 to the ends of the cylinder 80. When the parts are in the position shown in Figure 6, the pressure of space 93 is not transmitted to the cylinder, but if the rotor is turned in either direction it uncovers one of the openings 94 so as to put the corresponding conduit 95 in communication with the space 93, the other conduit being connected to the atmosphere through an opening 96. Assuming that the cylinder 88 contains air under pressure, if handle 92 is moved in a clockwise direction so as to uncover the opening 94 towards the left, the piston 85 will move upwardly thereby shifting the position of the steering bar 12 from the full line to the dotted line position shown in Figure 1. Rod 55 has another projection 77a that engages the eccentrically mounted ball bearing and clamps the bar in position in bracket 57. This clamping action takes place as long as the pressure is maintained in the cylinder tending to urge the steering ball upwardly when viewed as in Figure 6. When the steering bar is in the broken line position shown in Figure 1, the tow car and the trailer can be backed and after the backing has been completed, handle 92 is turned in a counterclockwise direction, thereby introducing pressure to the upper end of cylinder 80, whereupon the steering bar 20 will be moved downwardly to the full line position in which position the parts are arranged for forward motion.

Attention is called to the fact that when the parts are in the position shown in Figure 6, the ball pivot 56 is directly over the corresponding ball pivot at the end of the tongue so that the tongue and the steering bar can rotate about a vertical pivot without effecting any shifting of the angular relationship of the wheels 11 with the axle of the trailer.

Although a full explanation will not be given here, it is apparent that with the parts in the full line position shown in Figure 1, a trailer would not operate properly in going around curves and therefore provision has been made to shift the steering bar to the broken line position.

Having described the invention what is claimed as new is:

A trailer hitch and steering device comprising, in combination, a tongue, means at one end thereof for effecting an attachment to a trailer axle, means at the other end thereof for effecting a connection with a towing vehicle, a pivot carried by and extending upwardly from the tongue adjacent the axle attaching means, a bell crank lever operatively secured to the pivot, a steering bar having one end pivotally connected with the free end of one of the bell crank arms, the other end of the steering bar having a two-part socket, means for moving one part of the socket relative to the other to engage and disengage a cooperating ball member, a ball member mounted on the tongue for cooperatively engaging the two-part socket on the steering bar for forming a stress triangle consisting of the tongue, the steering bar and one arm of the bell crank lever, the two-part socket serving the dual purpose of connecting the steering bar either to the tongue or to a similar ball member carried by the tractor.

CLAUDE K. ELWOOD.